(12) United States Patent
Sievers et al.

(10) Patent No.: US 7,281,269 B1
(45) Date of Patent: Oct. 9, 2007

(54) METHODS, DATA STRUCTURES, AND SYSTEMS TO REMOTELY VALIDATE A MESSAGE

(75) Inventors: A. Kent Sievers, Orem, UT (US); Jay Parker, Cedar Hills, UT (US); Preston D. Stephenson, American Fork, UT (US); Samuel F. Fletcher, Orem, UT (US)

(73) Assignee: Novell, Inc., Provo, UT (US)

( * ) Notice: Subject to any disclaimer, the term of this patent is extended or adjusted under 35 U.S.C. 154(b) by 761 days.

(21) Appl. No.: 10/092,822

(22) Filed: Mar. 6, 2002

(51) Int. Cl.
*G06F 11/00* (2006.01)

(52) U.S. Cl. .................................. 726/24; 713/161

(58) Field of Classification Search ............... 713/161; 726/24
See application file for complete search history.

(56) References Cited

U.S. PATENT DOCUMENTS

| | | | |
|---|---|---|---|
| 5,623,600 A * | 4/1997 | Ji et al. ...................... 726/24 |
| 5,832,208 A * | 11/1998 | Chen et al. .................. 726/24 |
| 5,889,943 A * | 3/1999 | Ji et al. ...................... 726/22 |
| 6,145,079 A * | 11/2000 | Mitty et al. ................. 713/170 |
| 6,161,181 A * | 12/2000 | Haynes et al. ............... 713/170 |
| 6,195,587 B1 * | 2/2001 | Hruska et al. ............... 700/2 |
| 6,199,052 B1 * | 3/2001 | Mitty et al. .................. 705/75 |
| 6,321,267 B1 * | 11/2001 | Donaldson .................. 709/229 |
| 6,393,568 B1 * | 5/2002 | Ranger et al. ............... 713/188 |
| 6,442,600 B1 * | 8/2002 | Anderson .................... 709/217 |
| 6,487,586 B2 * | 11/2002 | Ogilvie et al. .............. 709/206 |
| 6,546,486 B1 * | 4/2003 | Perlman et al. ............. 713/153 |
| 6,560,705 B1 * | 5/2003 | Perlman et al. ............. 713/154 |
| 6,584,564 B2 * | 6/2003 | Olkin et al. ................. 713/152 |
| 6,609,196 B1 * | 8/2003 | Dickinson et al. .......... 713/154 |
| 6,650,890 B1 * | 11/2003 | Irlam et al. ................. 455/412.1 |
| 6,654,787 B1 * | 11/2003 | Aronson et al. ............ 709/206 |
| 6,701,440 B1 * | 3/2004 | Kim et al. ................... 726/24 |
| 6,721,721 B1 * | 4/2004 | Bates et al. .................. 707/1 |
| 6,772,196 B1 * | 8/2004 | Kirsch et al. ............... 709/206 |
| 6,851,049 B1 * | 2/2005 | Price, III .................... 713/150 |
| 6,851,058 B1 * | 2/2005 | Gartside ...................... 726/24 |
| 2002/0007453 A1 * | 1/2002 | Nemovicher ................ 713/155 |
| 2002/0091776 A1 * | 7/2002 | Nolan et al. ................ 709/206 |
| 2002/0095607 A1 * | 7/2002 | Lin-Hendel ................. 713/201 |
| 2002/0129237 A1 * | 9/2002 | Radatti et al. .............. 713/153 |
| 2002/0147780 A1 * | 10/2002 | Liu et al. .................... 709/206 |
| 2002/0157008 A1 * | 10/2002 | Radatti ....................... 713/188 |
| 2004/0054886 A1 * | 3/2004 | Dickinson et al. .......... 713/153 |

* cited by examiner

*Primary Examiner*—Gilberto Barrón
*Assistant Examiner*—David G Cervetti
(74) *Attorney, Agent, or Firm*—Schwegman, Lundberg & Woessner, P.A.

(57) ABSTRACT

Methods, data structures, and systems are provided to validate a message. A client receives a message in a first encrypted format. The message is decrypted and transferred to a remote server before being accessed by the client. In one embodiment, the client encrypts the message in a second encrypted format before transferring the message to the remote server. The remote server scans and validates the message and sends a result of the scan to the client. The client removes the message if the result indicates the remote server did not validate the message. Moreover, the client accesses or otherwise consumes the message if the result indicates the message was validated by the remote server.

20 Claims, 4 Drawing Sheets

METHODS, DATA STRUCTURES, AND SYSTEMS TO REMOTELY VALIDATE A MESSAGE

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright© 2002, Novell, Inc., All Rights Reserved.

FIELD OF THE INVENTION

The present invention relates to validating a data message, and in particular to methods, data structures, and systems used to remotely validate an electronic mail (email) message in a networked environment.

BACKGROUND OF THE INVENTION

Organizations have become dependent on large-scale distributed electronic mail (email) systems. Employees enjoy the benefit of using the email system throughout the organization from local or remote locations utilizing existing networking solutions. Conventionally, an email server processes incoming email to a particular employee's mailbox or to a group of mailboxes. Likewise, the email server processes outgoing email messages from mailboxes associated with the employees. Any given email message can originate from a source that is internal to the organization or external to the organization. Typically, all email messages received within the organization from an external source pose a potential risk of having a virus that may infect the organization's email system and potentially an entire network of the organization. Although as one or ordinary skill in the art readily appreciates, internal emails can also, in some instances, create a risk of releasing a virus within the organization's email system and/or network.

A virus-infected email message can be released within the organization in a variety of ways such as, and by way of example only, opening/executing an attachment associated with the email, saving the email, displaying the email, printing the email, activating a virus-releasing hypertext link embedded in the email, and the like. Organizations have expended substantial resources to detect and isolate viruses before the viruses can cause any significant damage to computing resources of the organization.

For example, once a virus-infected email is detected within an organization's email system an email administrator can identify the subject and sender associated with the email. Next, the administrator can recall, from all mailboxes within the email system, the virus-infected email. However, the administrative recall is only useful for those mailboxes that have not yet already opened or otherwise accessed the virus-infected email. Correspondingly, this technique minimizes the damage associated with releasing the virus-infected email multiple times throughout the email system, but does not prevent an initial release of the virus-infected email.

Other techniques install virus-checking software on the email clients of the employees, such that email messages are scanned when received in mailboxes associated with the email clients. But, these techniques require an administrator to continually update and supply patches to each of the email clients as the virus-checking software is updated or fixed, creating excessive maintenance and support issues for the email administrator in trying to keep each of the email clients in synch with the latest version and/or new releases of the virus-checking software.

Still other techniques provided hooks within the email system that permit the email administrator to install virus-checking software on an email server in order to scan incoming email as it is processed from an external source to a number of the mailboxes within the email system. However, these techniques are unable to scan certain types of encrypted emails. For example, an email message in a Secure Multi-Purpose Internet Mail Extension (S/MIME) format can only be decrypted for access by the email client to which the email message is directed because private information residing on the email client includes keys that are necessary to decrypt the S/MIME email message, and these keys are not accessible and available to the email server. As a result, some organizations have banned and removed all incoming S/MIME email messages. Moreover, if virus-checking software is installed on each email client, then each email client must be visited and manually maintained by the email administrator, and if the administrator misses a single email client, then the entire email system remains vulnerable to virus infection.

Some conventional techniques have attempted to address this problem, by installing statistical approaches to metadata associated with S/MIME email messages. In these techniques, a sender's description, an attachment's description, a subject's description, a byte size of the email message, and the like, which are associated with the S/MIME email, are evaluated by the email server using customized heuristics to determine if the S/MIME email is infected with a virus. Again, these techniques only minimize and reduce virus exposure within the email system and cannot guarantee that the applied heuristics will completely eliminate virus exposure. In fact, the heuristics become trustworthier only after the email system has encountered and endured virus exposures, since once an exposure is encountered the heuristics are then updated to catch an already encountered virus based on the experience of having endured the encountered virus.

Still other techniques have been used to ensure senders and recipients of emails are in trusted relationships with one another. In these techniques, an intermediary intercepts incoming email messages and further encrypts the email messages based on the senders and the recipients. The senders and recipients include keys and/or decryption software to decrypt the encrypted email messages. However, if an email message is originally in a S/MIME format, then any decryption performed by a recipient of the intermediary's encrypted format will still yield a S/MIME email message that has not been scanned for viruses, since the intermediary is unable to decrypt the S/MIME email message. And, even trusted, innocent, and unknowing senders can inadvertently transmit virus-infected email messages to recipients.

As is apparent, there exists a need for improved techniques that scan email messages within an email system for viruses. Further, there exists a need for more reliable techniques that scan S/MIME email messages for viruses remote from an email client.

SUMMARY OF THE INVENTION

In various embodiments of the present invention, techniques for remotely scanning and validating data messages are described. The client receives the data message in a first encrypted format. The client then decrypts the data message and transfers the data message to a remote server for validation. Upon receiving an indication as to whether the data message was validated successfully, the client accesses the data message. If the data message was not validated successfully, then the client removes the data message and does not attempt to access the data message.

More specifically and in one embodiment of the present invention, a method to remotely validate an email message is provided. Initially the email message is received in a first encrypted format. Further, the email message is decrypted from the first encrypted format and transferred to a remote server. Next, a status flag is received from the remote server. The status flag includes a value indicating whether the remote server has validated the email message.

In another embodiment of the present invention, a method to validate a data message is presented. A data message is received from a client and scanned for viruses. Furthermore, a validation flag is generated and sent to the client. The validation flag includes a value indicating whether the data message included zero or more of the viruses.

In still another embodiment of the present invention, an email system to validate an email message is described. The email system includes a local email set of executable instructions residing on a client and a remote validation set of executable instructions residing on a server. The email message is received by the local email set of executable instructions, decrypted, and streamed to the remote validation set of executable instructions. The remote validation set of executable instructions scans and validates the email message and further generates a validation flag associated with a result of the scan. The result is then sent to the local email set of executable instructions.

In yet another embodiment of the present invention, an email message residing on a computer readable medium operable to be remotely validated is provided. The email message includes a first encrypted format associated with content data of the email message and a second encrypted format associated with the content data. An email client decrypts the first encrypted format to render the content data and further generates the second encrypted format for the content data. Next, the email client transfers the second encrypted format to a remote server, and the remote server renders the content data by decrypting the second encrypted format. Moreover, the remote server scans the content data for viruses.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

Software for the system is stored on one or more computer readable media. In one embodiment the software is stored on secondary storage, such as a disk drive, and loaded into main memory and cache of the computer as needed. The software is written in the form of executable instructions that generally provide a single function or subsets of related functions. However, in various embodiments, the software comprises a single module or many modules, and there is no requirement that functions be grouped together. Hardware and/or firmware are used to implement the invention in further embodiments. The software may implement the functions, or simply facilitate the performance of the function by a human by providing menu driven interfaces, or other means of providing information to the system for data storage.

As used herein "email system" refers to email clients operating on client-computing devices and email servers operating on server-computing devices. The email system includes a variety of software such that the email clients and the email server communicate with one another to manage, receive, send, and distribute email messages throughout the email system and external to the email system. Moreover, the email system can be distributed across any network such as, and by way of example only, a local area network (LAN), a wide array network (WAN), Internet, and others. Communications within the network can be accomplished using hardwired communication protocols, wireless communication protocols, or a combination thereof.

Furthermore in one embodiment, the present invention is implemented using a GroupWise email system distributed by Novell, Inc. of Provo, Utah. Moreover, in one embodiment the email system operates in a Netware operating system (OS) environment distributed by Novell, Inc. of Provo, Utah. Of course any email system or operating system can be used without departing from the teachings of the present invention.

Figure 1:
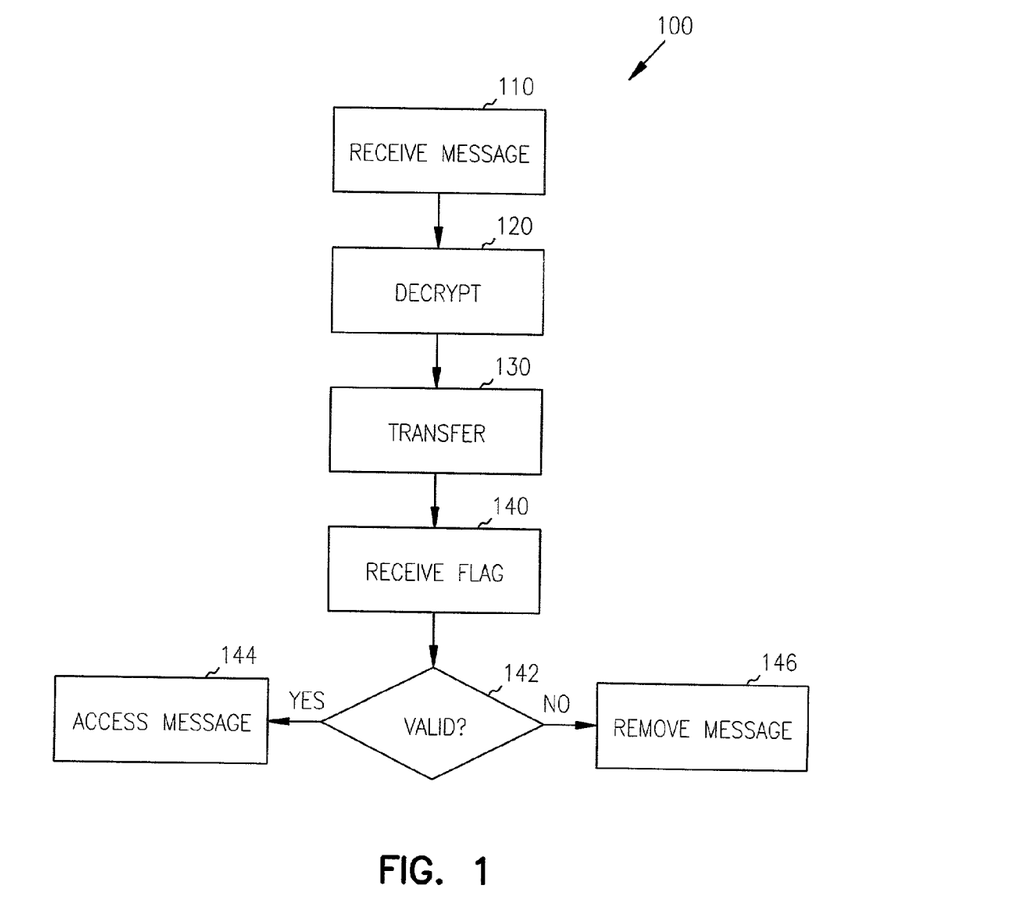
FIG. 1 is a flowchart representing a method of validating a data message, according to the teachings of the present invention.

FIG. 1 illustrates a flowchart representing one method 100 for validating a data message, according to the teachings of the present invention. Initially, a client and a server are in communication with one another in a networked computing environment. The client receives a data message in 110. In some embodiments, the client is an email client and the data message is an email message. In other embodiments, the data message is any data message that is intercepted by an OS residing on the client.

The data message is received in a first encrypted format that can only be decrypted by the client. In one embodiment, the first encrypted format is a S/MIME format. The client is modified such that the data message is first decrypted in 120 but not immediately accessed by the client for consumption. Once the client successfully decrypts the data message, the data message is transferred in 130 to the server. In some embodiments, the transfer occurs using conventional data streaming techniques to improve the processing throughput experienced by the client when attempting to access the data message.

Moreover, in some embodiments, after the client decrypts the first encrypted format associated with the data message, the client encrypts the data message in a second encrypted format before transferring the data message in 130 to the server. As one of ordinary skill in the art will readily appreciate, this permits the client and server to communicate in a secure fashion. For example, the client can utilize public key infrastructure (PKI) techniques to communicate with the server, such that a private key of the client and a public key of the server are used to generate the second encrypted format. In this example, once the server receives the data message in the second encrypted format, the server uses a private key of the server and a public key of the client to decrypt the second encrypted format in order to obtain the data message. Of course any digital signature technique or encryption technique can be used to further ensure secure communications during the data message transfer from the client to the server, and all such techniques are intended to fall within the broad scope of the present invention.

Once the server acquires the data message, any off-the-shelf or customized software set of executable instructions is used to scan the data message. In some embodiments the scan determines that a software virus is included within the data message. In other embodiments, the scan determines the data message includes objectionable material (e.g., pornography, gambling, offensive language, non work-related material, and the like). The server then generates a flag having a value that allows the client to determine a result of the scan for purposes of determining whether to access or to remove the data message on the client. In one embodiment, if the server determines during the scan that the data message is unacceptable (e.g., includes viruses or objectionable material), then the server can affirmatively destroy or acquire the data message from the client with no further action required by the client.

In 140, the client receives the flag and its corresponding value from the server. The client then inspects the value of the flag to determine if the data message is valid and can be consumed by the client in 142. If the value of the flag is valid, then in 144 the client is free to access or otherwise consume the data message. However, if the value of the flag is not valid, then in 146 the client removes, ignores, or otherwise destroys the data message, and the data message is not accessed or consumed by the client.

In one embodiment, each time the client tries to access the data message method 100 is processed. In other embodiments, once an initial execution of method 100 determines access to the data message is acceptable, all subsequent access attempts to the data message bypass the processing of method 100, such that the client on subsequent access attempts can consume the data message without being burdened by the additional processing depicted in FIG. 1.

As one of ordinary skill in the art now appreciates, method 100 permits remote validation of data messages independent of the client, in situations where only the client can decrypt the data message. Moreover, the client does not access or consume the data message until the data message is validated. In this way, software viruses and objectionable data content can be effectively monitored and eliminated in a centralized and remote fashion from within a networked computing environment.

Figure 2:
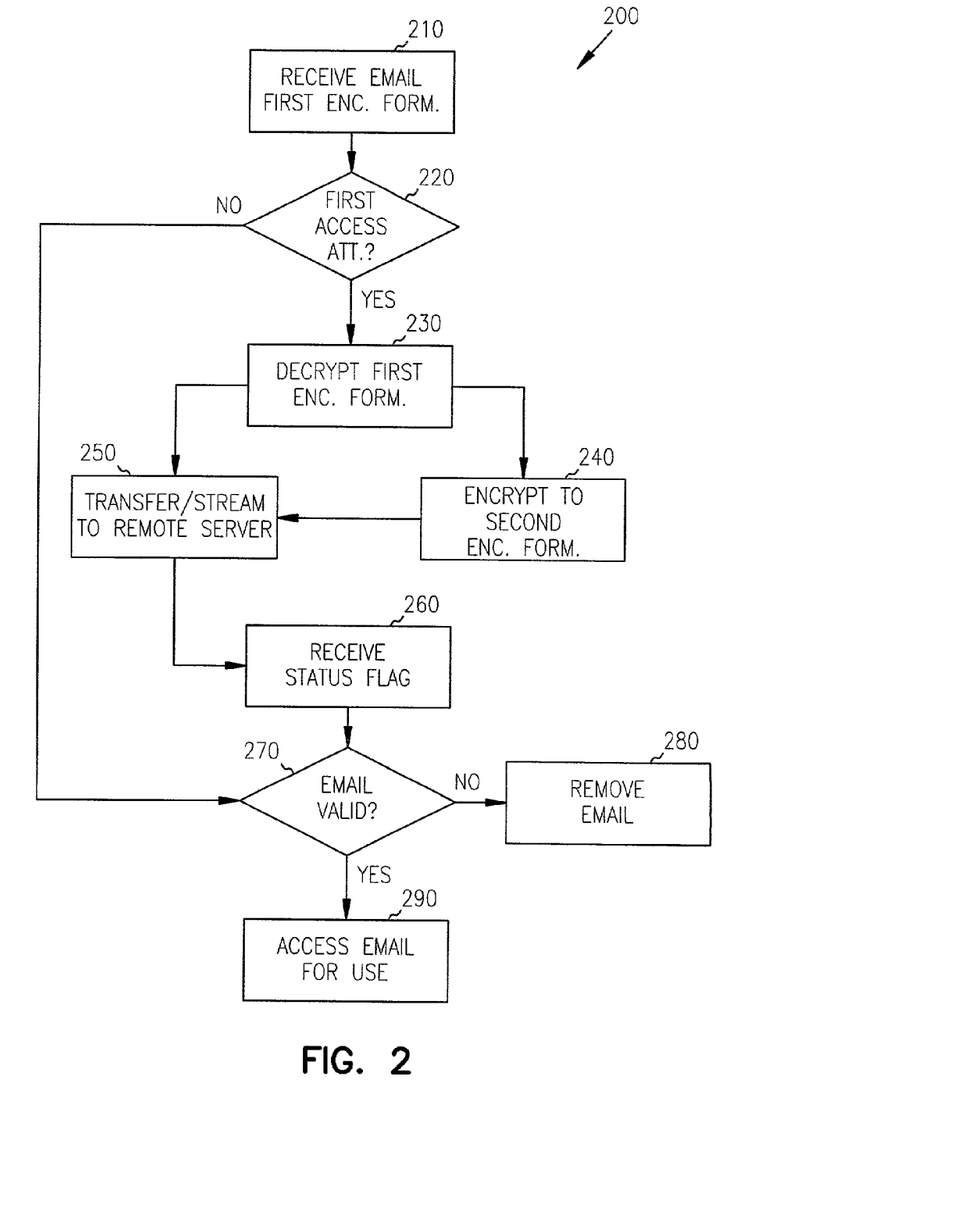
FIG. 2 is a flowchart representing a method to remotely validate an email message, according to the teachings of the present invention.

FIG. 2 illustrates a flowchart representing one method 200 for remotely validating an email message, according to the teachings of the present invention. An email client receives the email message in 210 in a first encrypted format. In one embodiment, the first encrypted format is a S/MIME format that can only be decrypted by the email client.

In 220 a check is made to determine if the email client is accessing the email message for a first time, or to determine if the access is related to subsequent accesses. If the access is associated with a first access, then in 230 the email client decrypts the email message from the first encrypted format. Next, and in one embodiment, the email client re-encrypts the email message in a second encrypted format in 240 for purposes of subsequent transfer to a remote server for validation. The second encrypted format can use any digital signature and/or encryption technique (e.g., PKI technique and others) when generating the second encrypted format.

In 250, the email message or the email message embodied in the second encrypted format is transferred or streamed to the remote server for validation. The remote server then uses any off-the-shelf or customized software scanning sets of executable instructions to validate the email message. Moreover, in some embodiments the email message includes text data and attachment data. A result of the scan indicates whether the email message has a software virus or alternatively whether the email message includes objectionable material. The remote server produces a status flag having a value that can be used by the email client to determine the result of the scan.

In 260, the email client receives the status flag and its associated value. The email client inspects the value in 270 to determine if the email message is valid. If the email message is valid, then in 290 the email client is free to access the email message. However, if the email message is invalid, then in 280 the email message is removed, ignored, or otherwise destroyed by the email client. In one embodiment, once the remote server determines the email message is invalid, the remote server immediately acquires or destroys the email message, and in this way the client cannot inadvertently access the invalid email message.

In still more embodiments, if in 220 the email client is attempting through subsequent accesses (e.g., not a first access) to consume the email message, then the client checks a previously retained status flag in 270 and bypasses the intervening processing depicted in FIG. 2. Of course in these embodiments, the email client can still be required to decrypt the email message from the first encrypted format for access (not depicted in FIG. 2), if the email client did not retain the decrypted first encrypted format.

Figure 3:
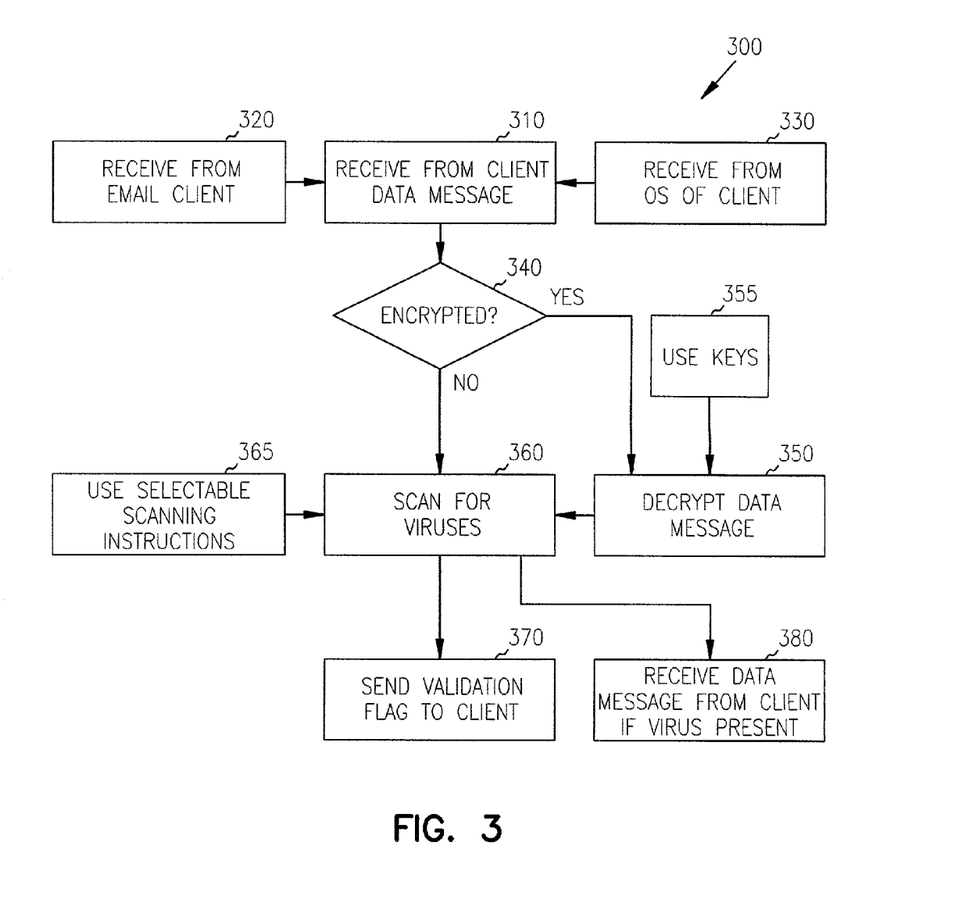
FIG. 3 is another flowchart representing another method of validating a data message, according to the teachings of the present invention.

FIG. 3 illustrates is another flowchart representing another method 300 for validating a data message, according to the teachings of the present invention. In 310, a data message is received from a client. In one embodiment, the data message is received from an email client in 320, and the data message is an email message that was originally processed by the client in a S/MIME format. In another embodiment, the data message is received from an OS associated with the client in 330. Furthermore, in some embodiments, the data message is streamed and received from the client using any conventional data streaming technique in order to improve processing throughput of method 300.

In 340 the received data message is checked to determine if the client originally encrypted the data message before it was received. Correspondingly, in 350 if the data message is encrypted, then it is decrypted. In one embodiment the encryption format used by the client permits the data message to be decrypted by using, in 355, a public key of the client.

Once the data message is acquired appropriately, then in 360 the data message is scanned for viruses. Any scanning set of executable instructions can be selected, hooked, and configured to scan the data message for viruses in 365. Moreover, in some embodiments where the data message is received as a data stream, the selected scanning set of executable instructions immediately scans the data message as the data message is received from the client. As one of ordinary skill in the art readily appreciates, this will further improve the processing throughput of method 300. A result of the scan will indicate whether zero or more viruses are detected within the data message.

Accordingly, a validation flag having a value indicating the result of the scan is sent to the client in 370. In some embodiments, the client uses the value to determine access permissions to the data message. Access permissions include no access, restricted access (e.g., view and print only), and full access (e.g., view, print, save, modify). Of course as one of ordinary skill in the art will appreciate, if may be desirable to grant or deny access to the data message in a binary fashion if any virus is detected at all in the data message. However, access permissions can be customized if desired with the tenets of the present invention. Moreover, in one embodiment if the scan determines that a virus is present in the data message, then in 380 the data message can be retrieved or removed from the client in a prophylactic fashion.

Figure 4:
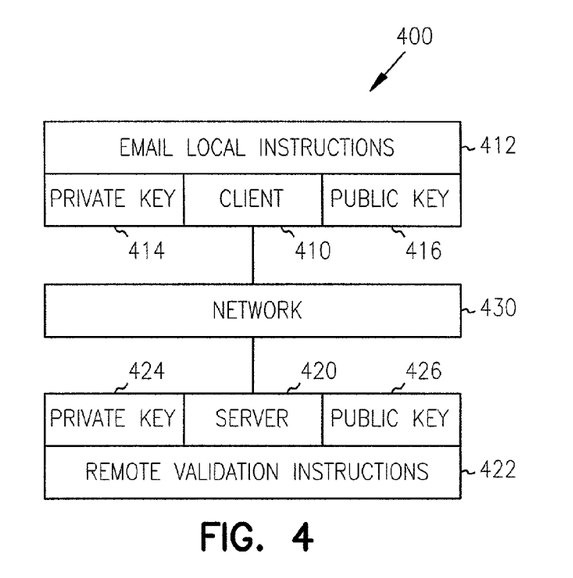
FIG. 4 is a block diagram of an email system, according to the teachings of the present invention.

FIG. 4 illustrates a block diagram of one email system 400, according to the teachings of the present invention. The email system 400 includes a local email set of executable instructions (LE) 412 and a remote validation set of executable instructions (RV) 422. Moreover, the LE 412 resides on a client-computing device 410, and the RV 422 resides on a server-computing device 420. Further, the LE 412 and the RV 422 are interfaced with one another via a network 430.

The LE 412 receives an email message in an encrypted format. In one embodiment, the encrypted format is a S/MIME format. Also, in other embodiments the LE 412 receives the email message from a sender that is external to email system 400. The LE 412 decrypts the email message and streams the email message to the RV 422 via the network 430. In one embodiment, before the email message is streamed to the RV 422, the LE 412 encrypts the email message in a different format, such that communications occurring between the LE 412 and the RV 422 are secure.

For example, the LE 412 can use a private key 414 associated with the client-computing device 410 and a public key 426 associated with either the server-computing device 420 or the RV 422 (not depicted in FIG. 4) to encrypted the email message before streaming the email message to the RV 422. Similarly, the RV 422 upon receipt of the encrypted email message uses a private key 424 associated with the server-computing device 420 and a public key 416 associated with either the client-computing device 410 or the LE 412 (not depicted in FIG. 4) to decrypted the email message. In this way, communications between client-computing device 410 and the server-computing device 420 are encrypted, decrypted, validated, and otherwise authenticated to provide added security to email system 400.

The RV 422 scans or uses any off-the-shelf or customized scanning sets of executable instructions to scan the email message for viruses or alternatively objectionable content. A result of the scan is associated with a validation flag by the RV 422 and sent to the LE 412 via the network 430. In one embodiment, the result validates that the email message is free from any viruses.

Upon receipt of the result by the LE 412, and inspection is made of the result. And, if the result indicates the email message is valid, then the LE 412 proceeds to access or otherwise consume the contents of the email message. In one embodiment, the email message includes text data and attachment data. If the result indicates the email message is invalid, then the LE 412 removes, destroys, or otherwise ignores the email message. In another embodiment, the RV 422 proactively removes, disables, or otherwise destroys the email message directly on the client-computing device 410 when the email message is determined from the scan to be invalid.

Figure 5:
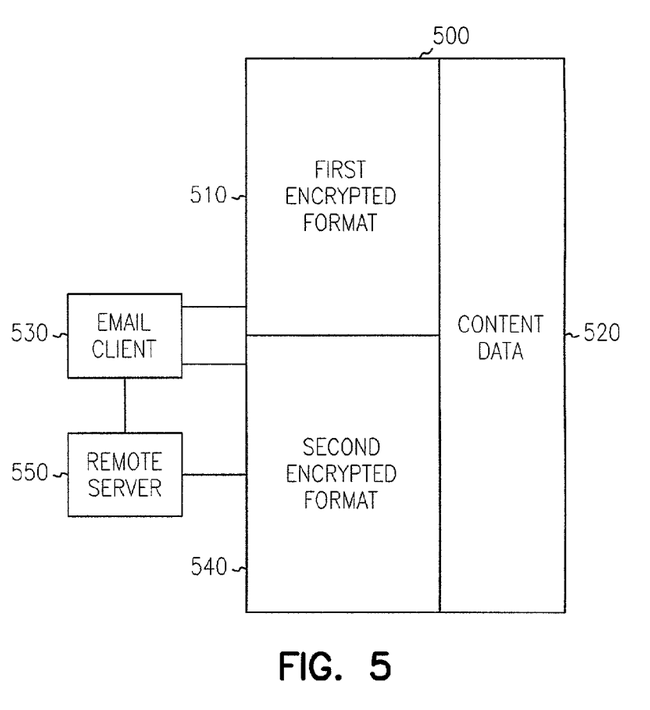
FIG. 5 is a block diagram of an email message, according to the teachings of the present invention.

FIG. 5 illustrates a block diagram of one email message 500, according to the teachings of the present invention. The email message includes a first encrypted format 510, content data 520, and a second encrypted format 540. The email message 500 resides on one or more computer-readable media and is accessible to an email client 530 and a remote server 550. The email message 500 is dynamically altered during processing by the email client 530 and the remote server 550, such that when the remote server 550 accesses the email message 500, the email message includes only the second encrypted format 540, from which the remote server 550 decrypts to render the content data 520. Moreover, the email client 530 acquires the email message in the first encrypted format 510, decrypts the first encrypted format 510 to render the content data 520, and then the email client 530 re-encrypts the content data 520 to produce the second encrypted format 540.

The email client 530 transfers or streams the second encrypted format 540 to the remote server 550. Again, the remote server 550 renders the content data 520 by decrypting the second encrypted format 540 of the transferred email message 500. In some embodiments, the first encrypted format is a S/MIME format and the second encrypted format is generated by the email client 530 by using a private key associated with the email client 530 and a public key associated with the remote server 550.

When the remote server 550 renders the content data 520 of the email message 500, the remote server 550 proceeds to scan the content data 520 for viruses. Further, a result of the scan is embodied in a validation flag that indicates whether zero or more viruses were detected during the scan of the content data 520. The remote server 550 can use any off-the-shelf or customized virus scanning sets of executable instructions to perform the scan against the content data 520.

The email client 530 accesses the content data 520 for consumption, when the scan performed by the remote server 550 indicates that no viruses were detected in the content data 520. Moreover, the email message 500 can include, in some embodiments, text data and attachment data. Further, in one embodiment, once the email client 530 receives an indication that the content data 520 associated with the email message 500 is free from viruses; subsequent accesses made by the email client 530 need not result in the content data 520 being re-encrypted in the second encrypted format 540 and re-streamed to the remote server 550 for re-validation. In this way, the email client 530 records a previous validation and optimally avoids any re-validation on the content data 520.

As one of ordinary skill in the art now appreciates upon reading the present disclosure, a remote server can validate a data message, within a network environment, when only a client is equipped to decrypt the data message. This is particularly useful in email systems where an email client receives external email messages in S/MIME formats. As a result, remote scanning utilities can be centralized and accessed more efficiently within a networked environment by utilizing the teachings of the present invention.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

Moreover, although for purposes of illustration the present invention was discussed in connection with email systems and email messages, it is readily apparent to one of ordinary skill in the art that the tenets of the present invention can be useful for any data communication occurring within a network. For example, a client's OS can be modified to intercept encrypted data before the data is accessed on a client, but after the client successfully decrypts the data. Next, the decrypted data can be transmitted to a remote scanning server and checked for viruses or any objectionable content. Once checked an indication is sent to the client, which either instructs the client to remove the data or grants permission to the client to access or otherwise consume the data. Alternatively if the checked data includes a virus or is otherwise objectionable, the remote scanning server can affirmatively retrieve or destroy the data residing on the client. In this way, any data message can be remotely validated in a networked environment using the teachings of the present invention.

What is claimed is:

1. A method to remotely validate an email message, comprising:
   receiving, at a recipient, the email message in a first encrypted format from a sender of the email message, wherein the recipient is whom the email message is directed to for consumption;
   decrypting, at the recipient, contents of the email message from the first encrypted format;
   transferring, from the recipient, the decrypted email message contents to a remote server; and
   receiving, at the recipient, from the remote server a status flag, wherein a value associated with the status flag indicates whether the contents are free from a virus or are free from objectionable material as validated by the remote server.

2. The method of claim 1, further comprising encrypting the email message in a second encrypted format before transferring the email message to the remote server.

3. The method of claim 1, further comprising accessing the email message for use, if the value of the status flag indicates the remote server validated the email message.

4. The method of claim 1, wherein in transferring the email message, the first encrypted format is a Secure Multi-Purpose Internet Mail Extension (S/MIME) format.

5. The method of claim 1, wherein in receiving the status flag, if the value of the status flag indicates the remote server validated the email message, then subsequent accesses made to the email message do not result in the email message being transferred to the remote server for validation.

6. The method of claim 1, wherein in transferring the email message, the email message is streamed to the remote server.

7. A method to validate a data message, comprising:
   receiving the data message from a client, wherein the data message was previously received at the client and sent from a sender of the data message to the client, wherein the client decrypts the data message before the data message is processed by the client, and wherein the client is external and remote to the method and communicates with the method over a network by sending the data message for scanning, and wherein the client is who the data message is directed to for consumption;
   scanning the data message for viruses; and
   sending a validation flag to the client, wherein the validation flag includes a value indicating whether the data message includes zero or more of the viruses.

8. The method of claim 7, further comprising decrypting the data message before scanning the data message.

9. The method of claim 8, wherein in decrypting the data message, the data message is decrypted using a public key of the client.

10. The method of claim 7, wherein in receiving the data message, the data message is an email message and the client is an email client.

11. The method of claim 7, wherein in receiving the data message, the data message is received from an operating system residing on the client.

12. The method of claim 7, wherein in scanning the data message, a scanning set of executable instructions is selectively executed to scan the data message for zero or more of the viruses.

13. The method of claim 7, wherein in receiving the data message, the data message is received as a data stream from the client and scanned as the data stream is received.

14. An email system to validate an email message, comprising:
   a local email set of executable instructions residing on a client;
   a remote validation set of executable instructions residing on a server; and
   wherein the email message is received by the local email set of executable instructions from a sender, who intends the email message for the client and the client is who the email message is directed to for consumption, and local email set of executable instructions decrypts the email message and then streams the email message to the remote validation set of executable instructions located on the server in an unencrypted format or in a different encrypted format from what was received on the client from the sender and wherein the email message is scanned and a validation flag associated with a result of the scan is sent to the local email set of executable instructions back on the client.

15. The email system of claim 14, wherein the local email set of executable instructions accesses the email message if the result indicates the scan validated the email message.

16. The email system of claim 15, wherein the scan validates the email message if the email messages are free of viruses.

17. The email system of claim 14, wherein the local email set of executable instructions removes the data message if the flag indicates the scan did not validate the email message.

18. The email system of claim 14, wherein communications between the local email set of executable instructions and the remote validation set of executable instructions are secure.

19. The email system of claim 18, wherein public and private key pairs associated with the client and the server are used to encrypt and authenticate the communications.

20. The email system of claim 14, wherein the email message includes an attachment message and wherein the email message is in a Secure Multi-Purpose Internet Mail Extension (S/MIME) format when received by the local email set of executable instructions.

* * * * *